United States Patent [19]
Zippe

[11] 3,929,445
[45] Dec. 30, 1975

[54] MIXTURE FEEDER FOR CONTINUOUS ELECTRIC GLASS-MELTING FURNACE

[76] Inventor: Alfred Zippe, Am Freiergrahen 10, 698 Wertheim, Germany

[22] Filed: July 5, 1974

[21] Appl. No.: 486,272

[52] U.S. Cl................ 65/335; 214/18 GD; 214/22
[51] Int. Cl.².................................................. C03B 3/00
[58] Field of Search............ 65/335; 214/18 GD, 22

[56] References Cited
UNITED STATES PATENTS

| | | | |
|---|---|---|---|
| 1,031,375 | 7/1912 | Reis | 214/22 |
| 1,751,987 | 3/1930 | Frink | 65/335 X |
| 3,219,209 | 11/1965 | Blaine | 65/335 X |
| 3,466,160 | 9/1969 | Keefer | 65/335 X |
| 3,495,966 | 2/1970 | West | 65/335 |

*Primary Examiner*—Arthur D. Kellogg
*Attorney, Agent, or Firm*—Burgess, Dinklage & Sprung

[57] ABSTRACT

An apparatus for distributing and feeding the mixture to the surface of a glass-melting furnace, which apparatus permits to obtain a complete covering of the surface of the molten glass mass while maintaining a uniform thickness of the layer, with a mixture spreading arm rotating above said mixture and uniformly distributing or spreading same by means of a horizontally extending portion.

10 Claims, 4 Drawing Figures

MIXTURE FEEDER FOR CONTINUOUS ELECTRIC GLASS-MELTING FURNACE

The present invention relates to an apparatus for distributing the mixture on the surface of a glass-melting furnace, especially of an electric glass-melting furnace.

Apparatuses of the type as outlined above serve to feed to the surfaces of molten glass masses, particularly of glass-melting furnaces, the mixtures required for the glass production, and to distribute these mixtures as uniformly as possible on such surfaces.

It is known to effect the feeding and the distribution of the mixture by means of conveyor belts the discharge point of which can be moved to and fro over the full surface area of the molten glass mass. However, feeding devices of this type suffer from the disadvantage that they are not only expensive and susceptible to failure, but also that the distribution of the mixture over the surface of the molten glass mass is inadequate. In particular, there will always be present a greater quantity below the respective discharge point than the quantity existing shortly in front of such discharge point.

Accordingly, it is the object of the present invention to provide an apparatus for distributing and feeding the mixture to the surface of a glass-melting furnace, which apparatus permits to obtain a complete covering of the surface of the molten glass mass while maintaining a uniform thickness of the layer, but which apparatus, on the other hand, allows to adjust zones of higher and lower covering or density with an adjustable maximum, and which apparatus, in particular, can be constructed economically and which is easy to operate and fail-safe and which, further, allows to adjust zones of minimum covering. Additionally, the apparatus according to the invention should permit to feed great quantities of the mixture with minimum space requirements, and it should be lend itself to be safely adapted to all operational conditions of the electric glass-melting furnace.

In accordance with the invention, this object is solved by a mixture spreading arm rotating above said mixture and uniformly distributing or spreading same by means of a horizontally extending portion.

Advantageously, for the feeding of the mixture there may be provided a reciprocating plate feeder or vibrating chute the end positioned inwardly of the furnace of which feeder extends at an angle relative to a tangent described about the center point of the furnace. In order to adjust a thin blanket of the mixture in the center of the furnace, advantageously the construction may be such that said mixture spreading arm includes a vertical extending portion coaxial to the furnace axis, an inclined portion joining said vertical portion, and a horizontally extending portion joining said inclined portion.

In order to avoid excessive heating of the mixture spreading arm, the latter may be provided with an inner tube and an outer tube whereby a cooling liquid is permitted to flow within the inner tube and in the opposite direction within the space between said inner and outer tubes. For improved distribution of the mixture, at least the horizontal portion of the mixture spreading arm has attached thereto a downwardly extending (depending) doctor blade. For the cooling of the reciprocating plate feeder, the latter may be of double-wall construction at least in its front part to receive a cooling liquid, and to adjust the maximum value of the mixture supply in accordance with the furnace requirements, the extension of the reciprocating plate feeder into the furnace space may be variable.

In order to equalize the distribution of the mixture within the furnace space, the mixture spreading arm may include means to vary its speed of rotation between speeds of from 2 to 10 rpm and/or to change its direction of rotation, and, further, the mixture spreading arm may be adapted to be adjusted in elevation relative to the furnace ceiling.

In order to avoid electrical discharges, preferably the drive means of the mixture spreading arm is electrically insulated from the spreading arm proper.

In the following, an exemplary embodiment of the invention is explained in greater detail by referring to the accompanying drawings, wherein.

Figure 1:
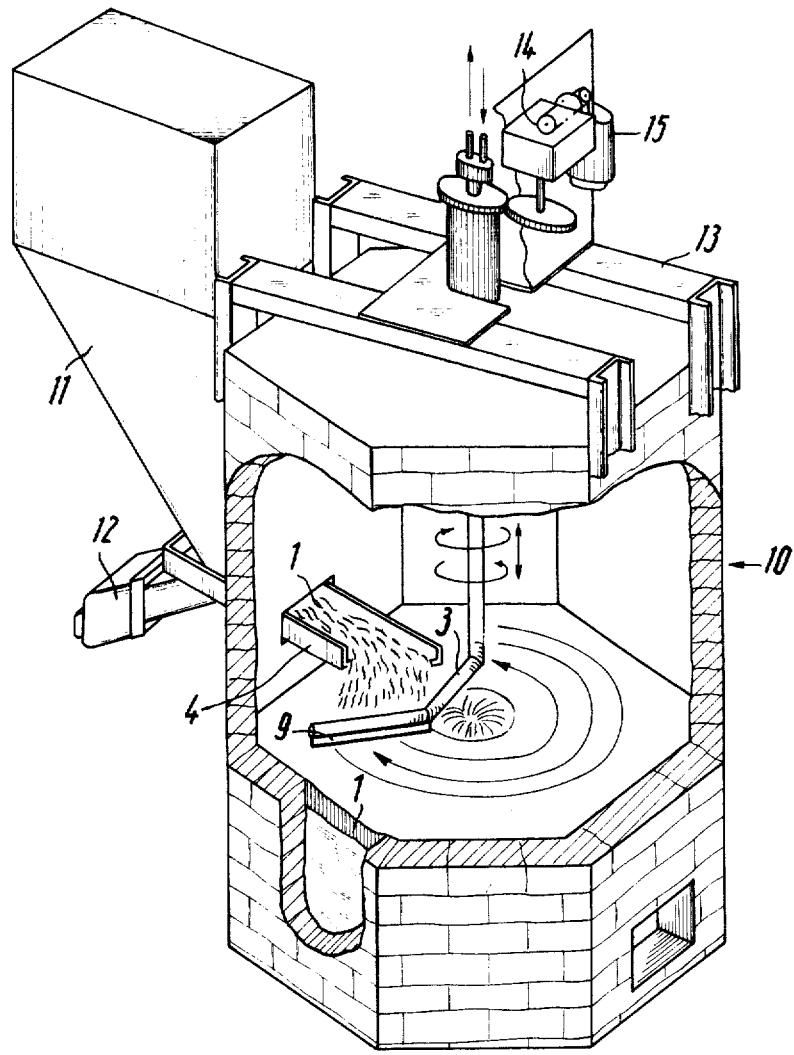
FIG. 1 is a perspective view of a glass-melting furnace including the feeding device according to the present invention.
Figure 4:
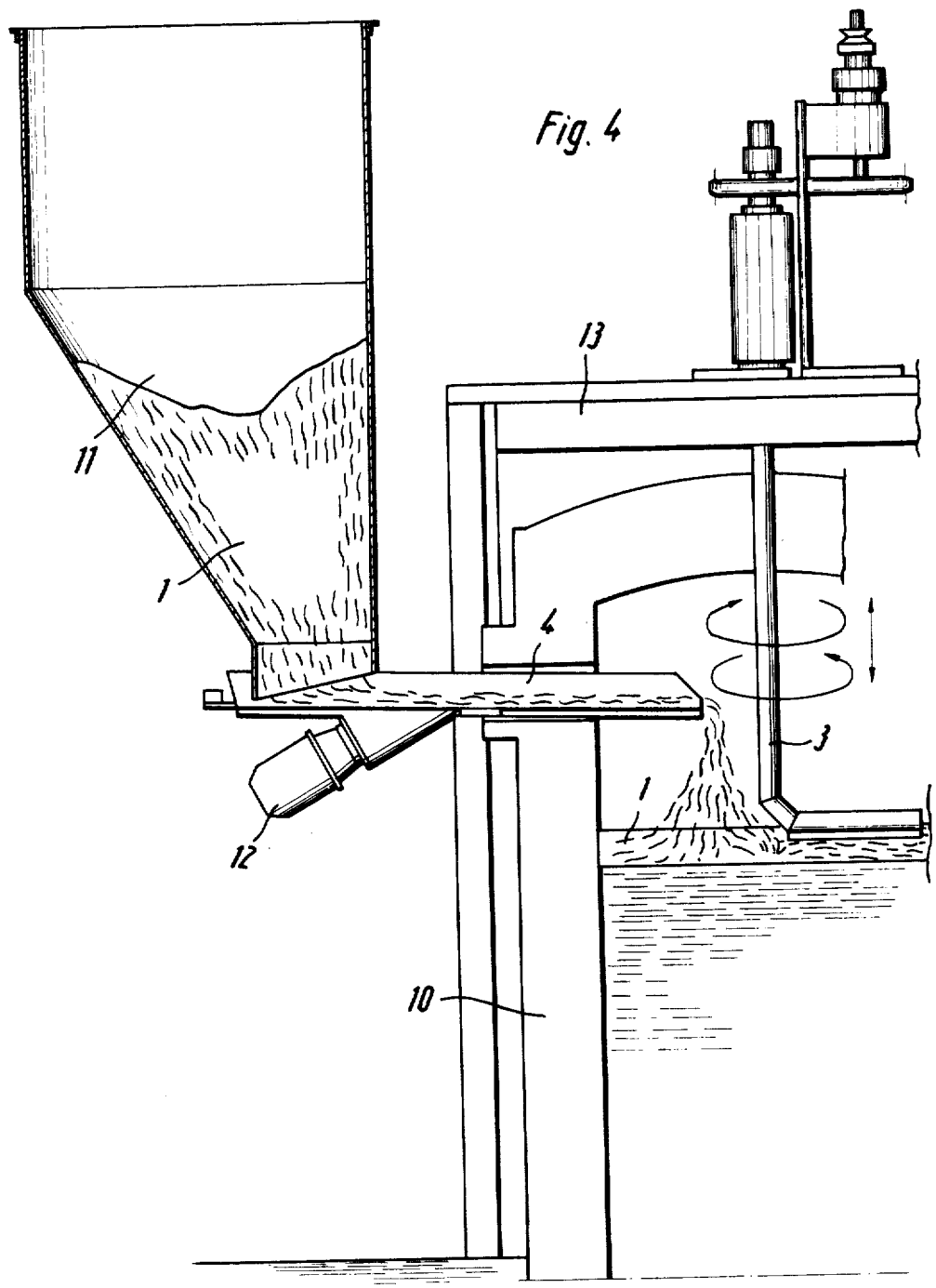
FIG. 4 is a sectional partial view of a glass-melting furnace including the feeding device according to the present invention.

In FIGS. 1 and 4, there is illustrated a glass-melting furnace 10 wherein a mixture blanket 1 floats on a molten glass mass. Fresh mixture is fed to the upperside of the mixture blanket 1, which mixture is uniformly distributed on the surface of the mixture blanket by the spreading arm 3 according to the invention while providing zones of lower covering.

The mixture per se is stored, e.g., within a reservoir 11, and such mixture is supplied from this reservoir, by gravity, onto a reciprocating plate feeder or vibrating chute 4 which extends through an opening provided in the brickwork of the furnace into the interior of the furnace and which chute is vibrated by means of an electromagnetic vibrator 12. The quantitative control of the mixture fed is effected by adjusting the rate of vibration of the vibrating chute. The vibrating chute 4 is obliquely cut at its front end (compare FIG. 1) such that is discharges the mixture in the form of a wide band into the glass-melting furnace. Preferably, the portion of the chute extending into the furnace is of a double-wall construction through which water is circulated for dooling purposes. The position of the vibrating chute 4 may be adjusted in such a manner that the obliquely disposed discharge band can be displaced radially inwardly and outwardly within the glass-melting furnace. By means of this displacement, the maximum of the feed can be varied within the furnace depending on the performance and condition of the furnace.

Figure 2:
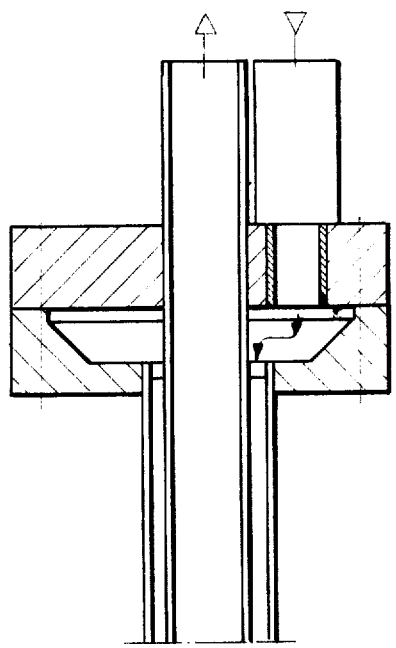
FIG. 2 is a longitudinal sectional view of a mixture spreading arm according to the present invention.
Figure 3:
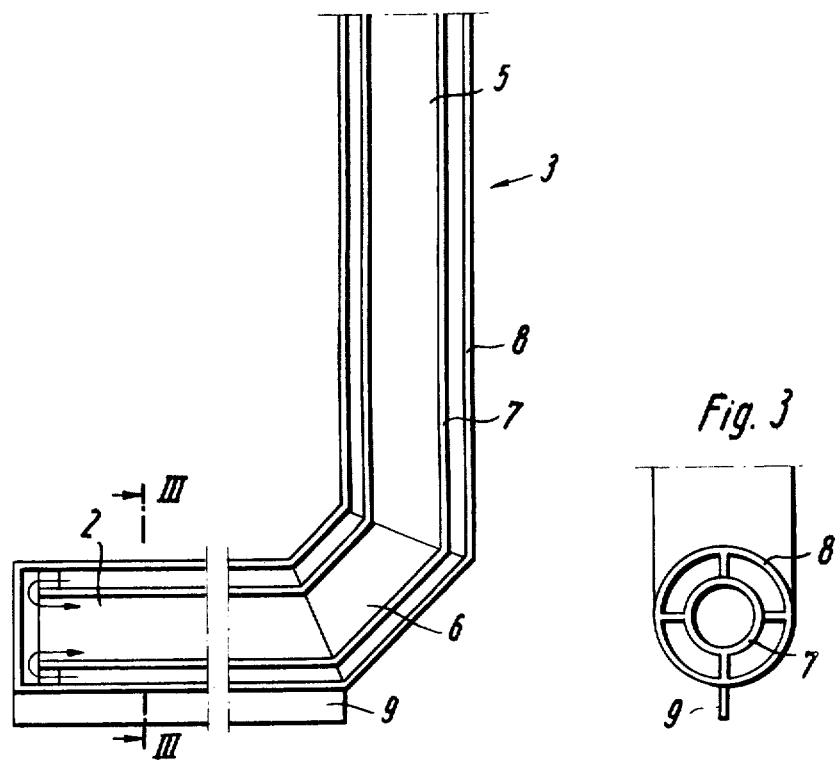
FIG. 3 is a cross-sectional view of the mixture spreading arm along lines 3—3.

Interiorly of the furnace space proper, there is provided a mixture spreading arm 3 which is adapted to rotate both in the directions to the right and to the left and which is adapted to be varied with respect to its elevation above the mixture by means of a not illustrated lifting device. According to FIG. 2, the mixture spreading arm 3 itself comprises an inter tube 7 and an outer tube 8 which are interfitted in a concentric relationship. The mixture spreading arm 3 is composed of a vertical portion 5, of an inclined portion 6 joining said vertical portion, and a horizontally extending portion 9 joining the inclined portion at its other end.

Cooling water is flowed into the space defined between the outer tube 8 and the inner tube 7, which cooling water is then discharged through said inner tube 7. Preferably, the outer tube 8 is formed of heat resistant stainless steel. The horizontally extending portion 2 has welded to the lowest point thereof a vertically depending mixture spreading plate 9 which performs the actual distribution of the mixture.

The furnace 10 proper carries a frame 13 on its upperside which frame may form a part of the general furnace structure and which has attached thereto the drive means for rotating the mixture spreading arm 3. Through a gear transmission 14, the peripheral speed of the mixture spreading arm can be continuously varied between 2 and 10 rpm, and, besides, a change of direction of rotation can be effected.

The mixture spreading arm including its drive means which is electrically insulated to avoid electrical discharges from the mixture spreading arm, may be displaced upwardly and downwardly in a guiding means with the aid of a not illustrated apparatus, such that an adjustment of the mixture distribution within the furnace space can be obtained in this way, too.

For the insertion of the mixture spreading arm, the ceiling of the glass melting furnace is provided with a gap through which the spreading arm may be introduced. Subsequently, in operation the gap may be closed except for the passage for the vertical portion 5 of the mixture spreading arm.

Then, the mixture fed into the furnace is uniformly distributed within the furnace in circular paths by the horizontal portion 2 of the mixture spreading arm 3. With an alternating rotation of the spreading arm, an absolutely uniform covering is obtained, whereby a maximum of the covering, i.e., of the height of the blanket, may be adjusted by retracting and extending the vibrating chute 4.

It is surprising to the expert that the apparatus according to the invention does not only allow to obtain, at any time and perfectly, an adjustment of the mixture discharge and of the mixture distribution to conform with the requirements of the furnace operation, but that also the degassing of the molten glass mass and of the melting mixture through the mixture blanket is not inhibited by the formation of zones of lesser covering, for example in the center portion of the furnace and in the corners of the hexagonal furnace housing into which the spreading arm does not reach.

Furthermore, it is surprising to the expert that the spreading arm according to the invention does not displace the mixture outwards against the furnace walls although the horizontal portion of the spreading arm 3 extends to almost adjacent the furnace wall.

It has been found that the mixture spreading arm 3, when constructed from an outer tube of stainless steel being resistant to a temperature of up to 1,100° C and having a wall thickness of 6 millimeters, is capable of withstanding the conditions normally prevailing in the upper portion of an electric glass melting furnace even over prolonged periods of time.

What I claim is:

1. Apparatus for delivering a fusible mixture to a blanket of said mixture floating on a molten glass mass in a vertical glass-melting furnace comprising:
   i. delivery means extending through the furnace sidewall and into the furnace interior, said delivery means being positioned above said blanket;
   ii. means for continuously feeding and fusible mixture to said delivery means; and
   iii. horizontal arm means mounted in the furnace for spreading and leveling mixture delivered to said blanket, said arm means being vertically adjustable and adapted to rotate about a vertical axis in a circular path below the delivery means.

2. Apparatus of claim 1 wherein means are provided for vibrating the delivery means.

3. Apparatus of claim 1 wherein the end of the delivery means in the furnace interior extends at an angle relative to a tangent of a circle described about the center point of the furnace.

4. Apparatus of claim 1 wherein said arm means includes a vertically extending portion coaxial to the furnace axis, an inclined portion joining said vertical portion, and a horizontally extending portion joining said inclined portion.

5. Apparatus of claim 1 wherein said arm means includes an inner tube and an outer tube and means to circulate a cooling liquid through said inner tube and in the opposite direction through the space defined between the inner tube and said outer tube.

6. Apparatus of claim 4 wherein the horizontal portion of said arm means has attached thereto downwardly depending spreading means.

7. Apparatus of claim 1 wherein said delivery means, at least internally of said furnace, is of a double-wall construction to receive a cooling liquid.

8. Apparatus of claim 1 wherein said arm means includes means for varying its speed of rotation between 2 and 10 rpm and/or for changing its direction of rotation.

9. Apparatus of claim 1 wherein the degree of extension of said delivery means into the furnace interior is adjustable.

10. Apparatus of claim 1 wherein the means for rotating said arm means are electrically insulated from said arm means.

* * * * *